United States Patent
Tummalapenta et al.

(10) Patent No.: US 10,944,547 B2
(45) Date of Patent: Mar. 9, 2021

(54) SECURE ENVIRONMENT DEVICE MANAGEMENT

(71) Applicant: International Business Machines Corporation, Armonk, NY (US)

(72) Inventors: Srinivas B. Tummalapenta, Broomfield, CO (US); Adam L. Griffin, Dubuque, IA (US); Nikhilkumar V. Shah, Bear, DE (US); Huyanh D. Ngo, Sterling Heights, MI (US); Paul A. Ragone, Winter Garden, FL (US)

(73) Assignee: International Business Machines Corporation, Armonk, NY (US)

( * ) Notice: Subject to any disclaimer, the term of this patent is extended or adjusted under 35 U.S.C. 154(b) by 96 days.

(21) Appl. No.: 16/100,513

(22) Filed: Aug. 10, 2018

(65) Prior Publication Data
US 2020/0052882 A1     Feb. 13, 2020

(51) Int. Cl.
*H04L 9/06* (2006.01)
*G06F 9/455* (2018.01)
(Continued)

(52) U.S. Cl.
CPC ........ *H04L 9/0637* (2013.01); *G06F 9/45558* (2013.01); *G06F 21/602* (2013.01);
(Continued)

(58) Field of Classification Search
CPC ... H04L 9/0637; H04L 63/00; H04L 2209/38; H04L 2209/805; H04L 9/3239;
(Continued)

(56) References Cited

U.S. PATENT DOCUMENTS 6,961,448 B2   11/2005   Nichols et al.
8,131,565 B2    3/2012   Dicks et al.
(Continued)

FOREIGN PATENT DOCUMENTS

KR    101868589 B1    6/2018

OTHER PUBLICATIONS

P. Mell et al., "The NIST Definition of Cloud Computing", National Institute of Standards and Technology, Information Technology Laboratory, Sep. 2011, pp. 1-7.
(Continued)

*Primary Examiner* — Abu S Sholeman
(74) *Attorney, Agent, or Firm* — Law Office of Jim Boice

(57) ABSTRACT

A method manages software images in a blockchain-based environment of trusted devices. A trusted device creates a software image for sharing among members of a set of trusted devices that includes the trusted device. A blockchain mechanism stores the software image on a virtual machine that is in communication with the set of trusted devices, where the blockchain mechanism uses the set of trusted devices as peer members of the blockchain mechanism. A trusted device from the set of trusted devices receives, via the virtual machine, an access request for the software image from a requesting device from the set of trusted devices. The blockchain mechanism authorizes the access request by providing the software image to the requesting device.

19 Claims, 11 Drawing Sheets

(51) Int. Cl.
*G06F 21/62* (2013.01)
*G06F 21/60* (2013.01)

(52) U.S. Cl.
CPC .... *G06F 21/62* (2013.01); *G06F 2009/45587* (2013.01); *G06F 2009/45595* (2013.01)

(58) Field of Classification Search
CPC . H04L 9/0643; H04L 63/102; G06F 9/45558; G06F 21/62; G06F 21/602; G06F 2009/45595; G06F 2009/45587; G06F 17/30; G06F 2009/45562; G06F 21/6209; G06F 21/57; G06F 8/65; G06Q 30/06
See application file for complete search history.

(56) References Cited

U.S. PATENT DOCUMENTS

| | | | |
|---|---|---|---|
| 9,716,595 | B1 | 7/2017 | Kravitz et al. |
| 10,489,597 | B2* | 11/2019 | Safford .................. G06F 21/51 |
| 10,552,469 | B2* | 2/2020 | Maybee ................ G06F 3/0605 |
| 2006/0294192 | A1* | 12/2006 | Mao ....................... H04L 63/102 709/213 |
| 2008/0046039 | A1 | 5/2008 | Corndorf |
| 2008/0215509 | A1 | 9/2008 | Charlton |
| 2008/0235733 | A1 | 9/2008 | Heie et al. |
| 2008/0265733 | A1* | 10/2008 | Hue ....................... F25D 25/025 312/404 |
| 2013/0212161 | A1 | 8/2013 | Ben-Shaul et al. |
| 2014/0033226 | A1* | 1/2014 | Glazer ..................... G06F 9/542 719/311 |
| 2014/0053226 | A1 | 2/2014 | Fadida et al. |
| 2014/0258405 | A1 | 9/2014 | Perkin |
| 2014/0281489 | A1 | 9/2014 | Peterka et al. |
| 2015/0032838 | A1* | 1/2015 | Demsey .............. G06F 16/9574 709/213 |
| 2016/0080149 | A1* | 3/2016 | Mehta ................ H04W 12/0017 713/165 |
| 2016/0080474 | A1* | 3/2016 | Argenti ................... H04L 43/10 709/201 |
| 2016/0210626 | A1 | 7/2016 | Ortiz et al. |
| 2016/0216955 | A1* | 7/2016 | Kwon ........................ G06F 8/63 |
| 2017/0065823 | A1 | 3/2017 | Kaib et al. |
| 2017/0140145 | A1 | 5/2017 | Shah |
| 2017/0150939 | A1 | 6/2017 | Shah |
| 2017/0173262 | A1 | 6/2017 | Veltz |
| 2017/0177898 | A1* | 6/2017 | Dillenberger ....... G06F 16/2379 |
| 2017/0317824 | A1 | 11/2017 | Brown |
| 2018/0039667 | A1 | 2/2018 | Pierce et al. |
| 2018/0316502 | A1* | 11/2018 | Nadeau .................. G06N 20/00 |
| 2019/0207957 | A1* | 7/2019 | Espinosa ............... G06F 21/606 |
| 2019/0272604 | A1* | 9/2019 | Kim ........................ G06Q 20/36 |
| 2019/0349190 | A1* | 11/2019 | Smith ..................... H04L 69/18 |
| 2020/0012765 | A1* | 1/2020 | Smaiely ............. G06Q 20/1235 |

OTHER PUBLICATIONS

Citrix Systems, Inc., "Go Beyond Virtual Desktop Infrastructure (VDI)" <https://www.citrix.com/virtualization/vdi.html>, Retrieved Aug. 10, 2018, pp. 1-4.

Powwow Mobile, "Core Technology", <https://www.powwowmobile.com/core-technology/>, Retrieved Aug. 10, 2018, pp. 1-3.

A. Lipman et al., "Medrec", MIT Media Lab, Viral Communications, <https://www.media.mit.edu/projects/medrec/overview/>, Retrieved Jun. 10, 2019, pp. 1-9.

B. Rios et al., "Understanding Pacemaker Systems Cybersecurity", Whitescope IO, Blog for https://WhiteScope.IO, May 23, 2017, pp. 1-4.

B. Rios et al., "Security Evaluation of the Implantable Cardia Device Ecosystem Architecture and Implementation Interdependencies", Whitescope, May 17, 2017, pp. 1-27.

Medtronic, Inc., "Product Information for Clinicians: Mycarelink Smart TM Monitor 25000, 30100, 30101", Medtronic, 2017, pp. 1-8.

Apple Inc., "Press Release: Apple Watch Series 4: Beautifully Redesigned With Breakthrough Communication, Fitness, and Health Capabilities", apple.com, Sep. 12, 2018, pp. 1-13.

Epripay GMBH, "Gesundheits Card" <www.gesundheitscard.org>, Retrieved Jun. 11, 2019, pp. 1-11.

Anonymous, "Healthcare: E-Health Records", <https://e-estonia.com/solutions/healthcare/e-health-record/> Retrieved Jun. 11, 2019, pp. 1-4.

John D. Halamka et al., "Blockchain Healthcare Today: About the Journal", Blockchain Healthcare Today, blockchainhealthcaretoday.com, Retrieved Jun. 11, 2019, pp. 1-6.

US Dept of Homeland Security NCCIC, "Medtronic 2090 Carelink Programmer Vulnerabilities (Update B)" Advisory (ICSMA-18-058-01), Oct. 11, 2018, US DHS, pp. 1-4.

L. Newman, "A New Pacemaker Hack Puts Malware Directly on the Device", www.wired.com/story/, Aug. 9, 2018, pp. 1-3.

IBM Patents or Patent Applications Treated as Related, Aug. 1, 2019.

* cited by examiner

SECURE ENVIRONMENT DEVICE MANAGEMENT

BACKGROUND

The present invention relates to the field of hardware devices, and particularly to hardware devices that are connected via a secure environment, such as a blockchain environment. Still more particularly, the present invention relates to managing content that is utilized by hardware devices that are connected via the blockchain environment.

There are approximately 8 billion intelligent hardware devices (e.g., computers, cell phones, smart appliances, etc.) globally today, and that number is rapidly expanding. Many of these devices have embedded operating systems that end-users interface with. Some estimations predict there will be over 50 billion Internet of Things (IoT) devices (i.e., intelligent devices that are able to communicate among themselves) eventually. This growth contributes to an increasing number of operating systems, and vendor types. At some point this quantity becomes no longer sustainable, and/or creates end user device/OS (operating system) fatigue. The management and upkeep of such devices thus becomes complex for both an enterprise and/or an end-user.

SUMMARY

In one or more embodiments of the present invention, a method manages software images in a blockchain-based environment of trusted devices. A trusted device creates a software image for sharing among members of a set of trusted devices that includes the trusted device. A blockchain mechanism stores the software image on a virtual machine that is in communication with the set of trusted devices, where the blockchain mechanism uses the set of trusted devices as peer members of the blockchain mechanism. A trusted device from the set of trusted devices receives, via the virtual machine, an access request for the software image from a requesting device from the set of trusted devices. The blockchain mechanism authorizes the access request by providing the software image to the requesting device.

In one or more embodiments of the present invention, a method manages software images in a non-blockchain based secure transaction environment in order to establish an environment of entitlement leveraging for trusted devices. A trusted device creates a software image for sharing among members of a set of trusted devices that includes the trusted device. The secure environment stores the software image using a supervisory machine that is in communication with the set of trusted devices. A requesting device from the set of trusted devices transmits, to the supervisory machine, an access request for the software image. The supervisory machine authorizes the access request, and the trusted device provides the software image to the requesting device.

In one or more embodiments of the present invention, the method(s) described above are implemented as a computer system and/or as a computer program product.

DETAILED DESCRIPTION

Figure 1:
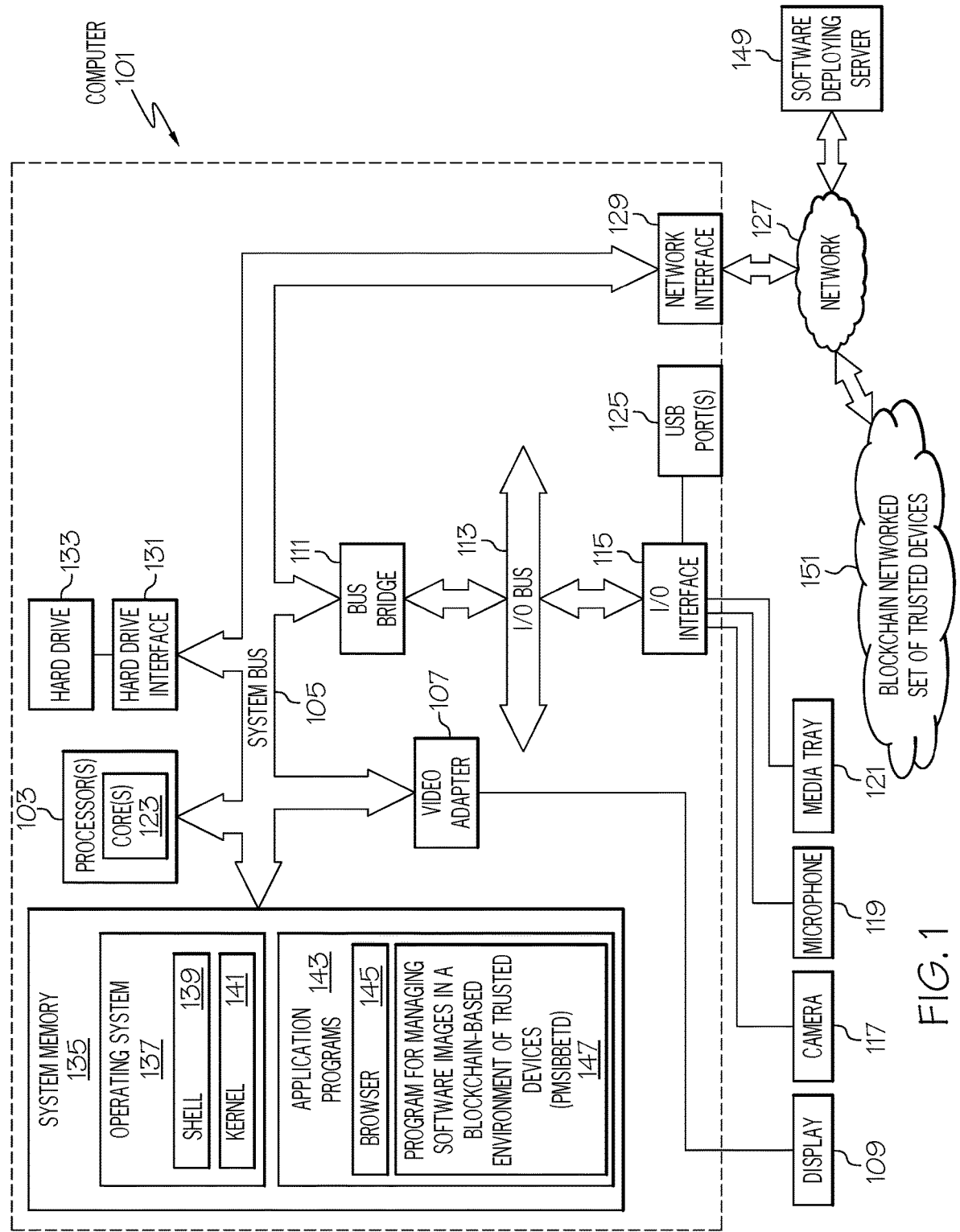
FIG. 1 depicts an exemplary system and network that is used in one or more embodiments of the present invention.

In one or more embodiments, the present invention is a system, a method, and/or a computer program product at any possible technical detail level of integration. In one or more embodiments, the computer program product includes a computer readable storage medium (or media) having computer readable program instructions thereon for causing a processor to carry out aspects of the present invention.

The computer readable storage medium is a tangible device that is able to retain and store instructions for use by an instruction execution device. In one or more embodiments, the computer is, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein are capable of being downloaded to respective computing/processing devices from a computer readable storage medium or to an external computer or external storage device via a network, for example, the Internet, a local area network, a wide area network and/or a wireless network. In one or more embodiments, the network comprises copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one or more embodiments, computer readable program instructions for carrying out operations of the present invention comprise assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. In one or more embodiments, the computer readable program instructions execute entirely on the user's computer, partly on the user's computer, as a stand-alone software package, partly on the user's computer and partly on a remote computer or entirely on the remote computer or server. In the latter scenario and in one or more embodiments, the remote computer connects to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, are implemented by computer readable program instructions in one or more embodiments of the present invention.

In one or more embodiments, these computer readable program instructions are provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one or more embodiments, these computer readable program instructions are also stored in a computer readable storage medium that, in one or more embodiments, directs a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one or more embodiments, the computer readable program instructions are also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function(s). In some alternative implementations, the functions noted in the block occur out of the order noted in the figures. For example, two blocks shown in succession are, in fact, executed substantially concurrently, or the blocks are sometimes executed in the reverse order, depending upon the functionality involved. It will also be noted that, in one or more embodiments of the present invention, each block of the block diagrams and/or flowchart illustration, and combinations of blocks in the block diagrams and/or flowchart illustration, are implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that are utilized in the one or more embodiments of the present invention. In accordance with various embodiments of the present invention, some or all of the exemplary architecture, including both depicted hardware and software, shown for and within computer 101 utilized by software deploying server 149 and/or devices within a blockchain networked Set of Trusted Devices 151.

In one or more embodiments of the present invention, exemplary computer 101 includes a processor 103 that is coupled to a system bus 105. Processor 103 utilizes one or more processors, each of which has one or more processor cores 123. A video adapter 107, which drives/supports a display 109 (which in one embodiment is a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which in one embodiment includes storage devices such as CD-ROM drives, multi-media interfaces, etc.), and external USB port(s) 125. While the format of the ports connected to I/O interface 115 is that which is known to those skilled in the art of computer architecture, including by not limited to universal serial bus (USB) ports.

As depicted, computer 101 is able to communicate with a software deploying server 149 and/or other devices/systems using a network interface 129. Network interface 129 is a hardware network interface, such as a network interface card (NIC), etc. In one or more embodiments, network 127 is an external network such as the Internet, or an internal network such as an Ethernet or a virtual private network (VPN). In one or more embodiments, network 127 is a wireless network, such as a Wi-Fi network, a cellular network, etc. As such, computer 101 and/or blockchain networked Set of Trusted Devices 151 are devices capable of transmitting and/or receiving wireless and/or wired communications.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include a Program for Managing Software Images in a Blockchain-Based Environment of Trusted Devices (PMSIBBETD) 147. PMSIBBETD includes code for implementing the processes described below, including those described in FIGS. 2-9. In one embodiment, computer 101 is able to download PMSIBBETD 147 from software deploying server 149, including in an on-demand basis, wherein the code in PMSIBBETD 147 is not downloaded until needed for execution. In one embodiment of the present invention, software deploying server 149 performs all of the functions associated with the present invention (including execution of PMSIBBETD 147), thus freeing computer 101 from having to use its own internal computing resources to execute PMSIBBETD 147.

The hardware elements depicted in computer 101 are not intended to be exhaustive, but rather are representative to highlight essential components required by the present invention. For instance, in one or more embodiments computer 101 includes alternate memory storage devices such as magnetic cassettes, digital versatile disks (DVDs), Bernoulli cartridges, and the like. These and other variations are intended to be within the spirit and scope of the present invention.

With billions of consumer and business devices on the market connected to the Internet, and that number expected to grow exponentially, the following issues/factors arise: Efficiency, Security, Scalability, and Cost.

Efficiency: A user will be concerned with how he/she and/or his/her business can seamlessly use all of these devices and securely share personalized data across them. For example, assume that a user has a collection of "Vacation Photos", and wants to efficiently share these photos across all of his/her devices and/or other trusted devices. Such sharing is cumbersome and time consuming in the prior art, in which such photos must be sent as attachments to emails, text messages, etc. That is, in the prior art, ownership of content (e.g., photos, music, etc.) is not easy to associate with a particular person. However, the present invention provides a system in which a primary owner of the content can share content (e.g., photos, music, books, documents, data, transaction information, etc.) with other users of devices that are within a circle of trust (see FIG. 3), where in various embodiments of the present invention the other devices are of device types that are the same or different from the device used by the primary owner of the content.

Security: A user will be concerned as to how he/she and/or his/her business can seamlessly secure and protect not only his/her data (e.g., photos), but also his/her identity. Furthermore, there is a growing number of mandates/regulations in various industries that mandate how information must be protected from being accessed by unauthorized persons (e.g., the United States Health Insurance Portability and Accountability Act of 1996—"HIPPA"). Often such security requires endpoint solutions/agents/policies etc. not only at the endpoint of the holder of the information, but also at the endpoint of the requester of the information, which is time consuming and ineffective in securing the system.

Scalability: A user will be concerned as to how he/she and/or his/her enterprise can maintain his/her fleet of devices, including maintaining current software licenses for software running on such devices, reconciling different operating systems and applications on the devices, etc.

Cost: The user will be concerned with keeping down his/her costs, including the costs associated with the Efficiency, Security, and Scalability issues just discussed (e.g., reducing and/or keeping personal/business Information Technology (IT) costs under control, while still minimizing asset risks).

In order to address these issues, one or more embodiments of the present invention provide a Loyal Virtual Machine ("Loyal VM") solution.

Figure 2:
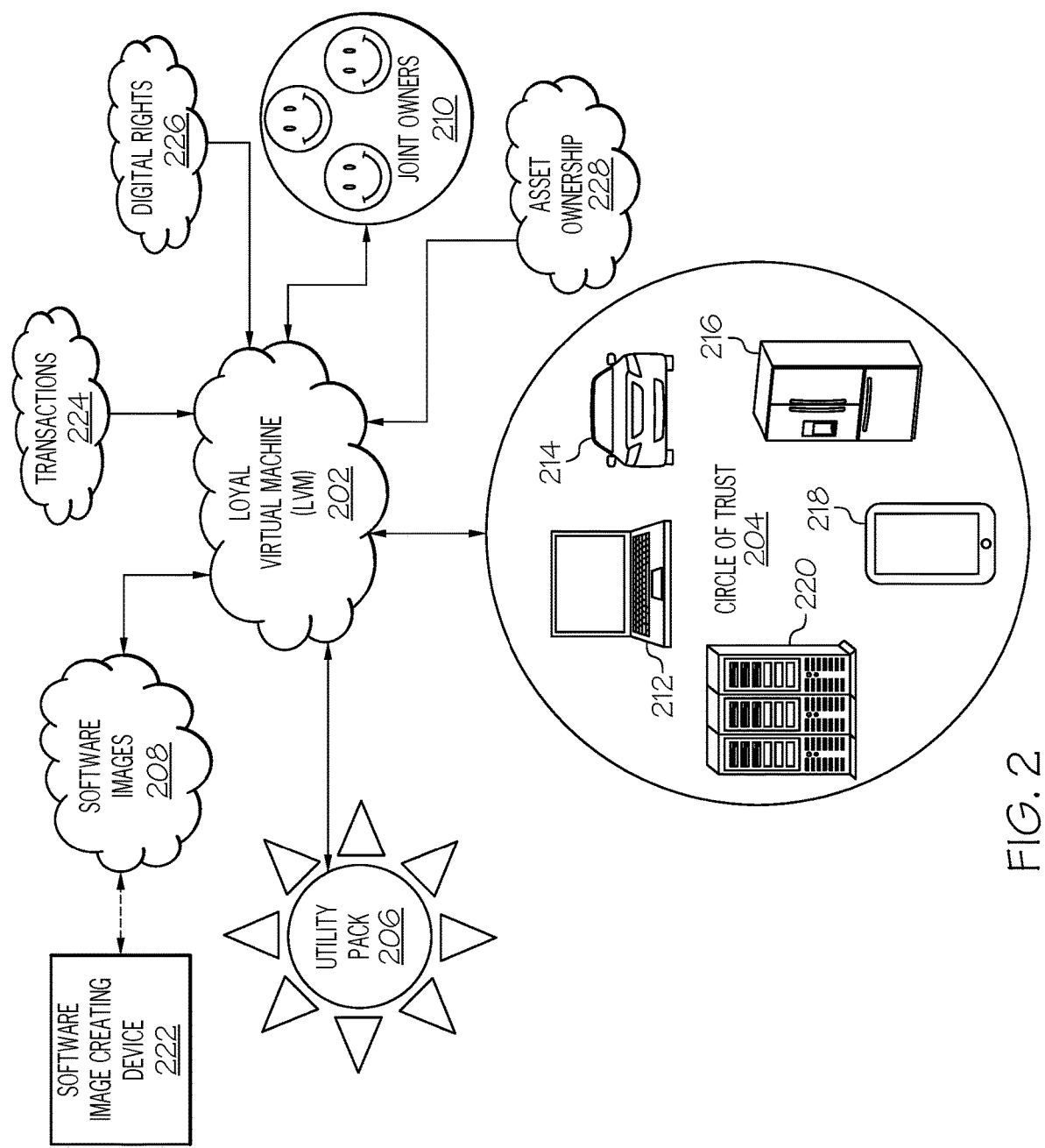
FIG. 2 depicts exemplary components of one or more embodiments of the present invention.

With reference now to FIG. 2, an overview of an exemplary embodiment of the present invention is presented.

As shown in FIG. 2, a Loyal Virtual Machine (LVM) 202 supports a circle of trust 204 by exchanging information from a utility pack 206, software images 208, and identities of joint owners 210 with the circle of trust 204.

Loyal VM (LVM) 202 is defined and described herein as 1) a "Container" for utilities (e.g., including a portable operating system) located in utility pack 206 and software images (e.g., text documents, photos, etc.) from software images 208; 2) resides on a machine (i.e., a physical computer or a virtual machine, which is a software emulation of a hardware computer that runs on one or more physical computers and is able to emulate the functionality of a physical computer system); 3) is portable in such a way that it can manage software images that are stored and played on any device from a Set of Trusted Devices (described herein and depicted in FIG. 2 as a circle of trust 204) that are used exclusively by joint owners 210; and 4) uses the Set of Trusted Devices as a blockchain mechanism (i.e., the Set of Trusted Devices are peers in a blockchain environment) that enables secure sharing of the utilities and software images among the devices in the Set of Trusted Devices. Thus, a Loyal VM is different from an Internet based VM, in that the Loyal VM requires the use of interconnected devices in the Set of Trusted Devices as a blockchain environment, and is OS-agnostic.

Figure 3:
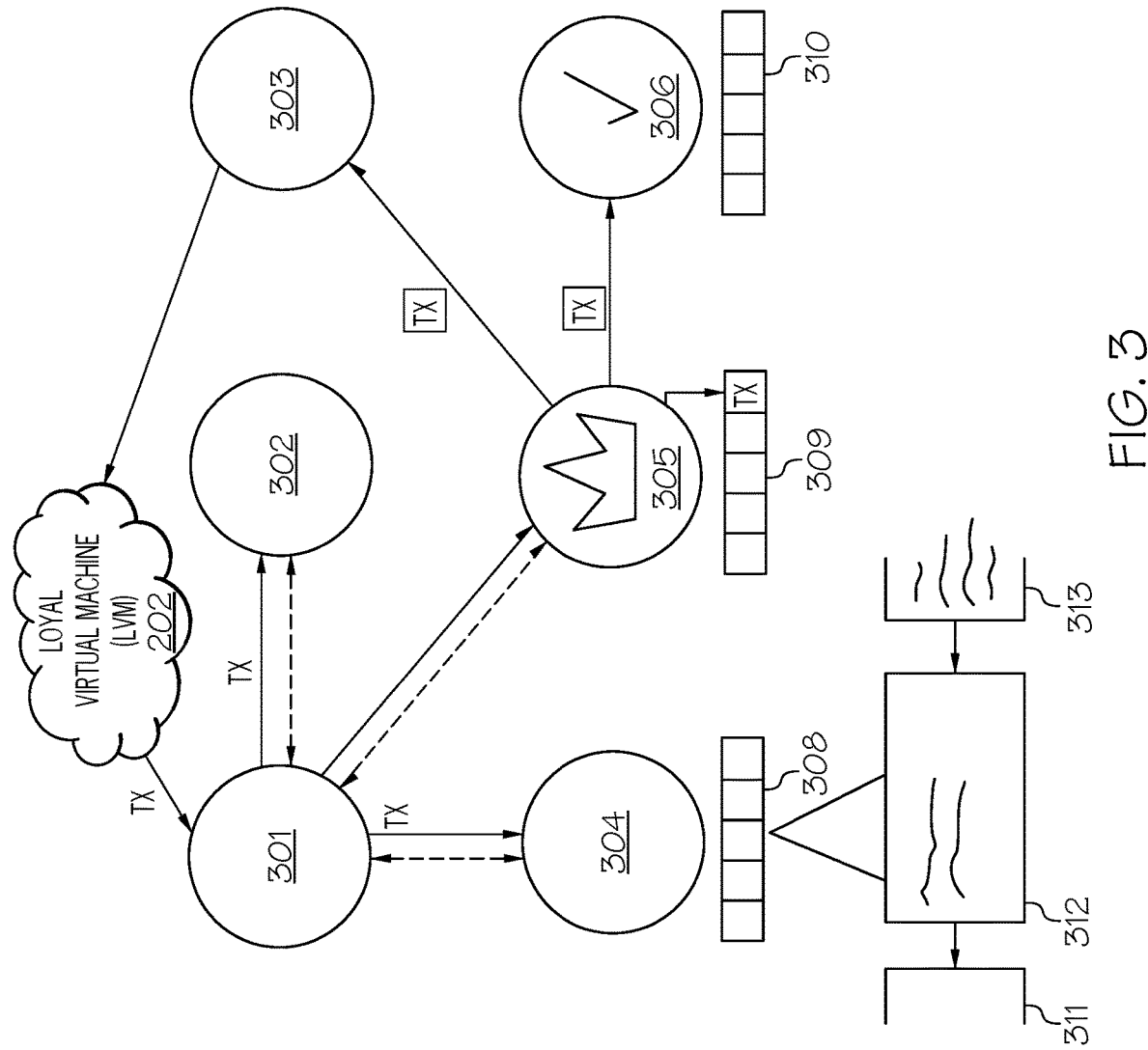
FIG. 3 illustrates an exemplary blockchain architecture as used in one or more embodiments of the present invention.

As used herein, the terms "blockchain mechanism" and "blockchain environment" are used interchangeably to describe a network of hardware devices that support blockchain processing, including but not limited to those devices depicted as blockchain networked set of trusted devices 151 shown in FIG. 1 and/or devices shown within circle of trust 204 in FIG. 2 and/or computers 301-306 shown in FIG. 3.

For purposes of illustration regarding how a Loyal VM (LVM) provides Efficiency, Security, Scalability, and Cost savings to a user, consider now the following features of LVM 202.

Efficiency—How does a user and/or enterprise seamlessly use all of their devices (e.g., the laptop 212, communicatively connected vehicle 214, "smart" appliance 216, cell phone 218, and server 220) and share personalized data across them?

Whether it be for business or personal usage, LVM 202 permits the end-user to have a consistent platform (provided by the portable OS, access to the software images 208, etc. from the LVM 202) across all of his/her devices. With this standardization, the end-user has constant access to family photos or reports or other software images (i.e., digital files such as photo files, text files, video files, data files, application files, etc.) across all of their personal and/or business devices without having to be continuously hampered by cloud shares or network transfers. This access creates greater efficiency, labor reductions and reduced complexity by eliminating the need for the end-user to have to know various OS types to conduct business/personal tasks, and to have to always poll a cloud system whenever a software image is needed.

Security—How does a user and/or enterprise seamlessly secure and protect his/her/its identity and data, and still remain compliant with the growing number of mandates in the industry?

With a prior art standardized solution, the security needs are met mainly in platform infrastructure. With LVM 202 and storage of software images 208 (e.g., music, photos, data, texts, etc.) in a cloud, however, the endpoint is no longer at-risk due to a potential lack of storage/disk space. Strong authentication methodologies still used at each endpoint (e.g., information in the utility pack 206, software images 208, names of joint owners 210, devices 212-220 within the circle of trust 204) still provide a potential attack vector, but the endpoints as used herein (in conjunction with blockchain methodology and LVM 202) cannot be compromised to the degree of traditional endpoints. That is, using the blockchain protocol described herein, an attacker is unable to access a software image since that attacker will not also have other information in a blockchain ledger such as an identifier of the LVM 202, the names of the joint owners 210, etc. Cloud security and use of the LVM 202 thus allows data to be centralized such that the data does not need to leave databases (within the cloud of software images 208) as frequently, since it is virtualized/shared among the devices shown within the circle of trust 204 when required from the end-user.

Scalability—How can the user/enterprise maintain its fleet of devices, manage licensing, and unify his/her/its digital footprint?

Scalability becomes less of a concern as provisioning, Identity and Access Management (IAM) secondary controls, and other back-end processes associated with endpoints and correlating accesses are reduced. Thus, there is greater control over privileged access as the access is unified in a single LVM profile.

Licensing compliance/management overhead is reduced as 1 End-User=1 License across all the various devices within the circle of trust 204.

In one or more embodiments of the present invention, each LVM instance is permitted to have various profiles assigned to it.

Cost—How does the user/enterprise reduce or keep his/her/its personal Information Technology (IT) and/or business IT costs under control, while minimizing his/her/its asset risks?

First, there is a reduction in licensing costs, since 1 OS=1 License. That is, since the LVM 202 provides a mobile OS that is used on all of the devices within the circle of trust 204, then only one OS license (for that portable OS) is required.

Second, a cloud solution centralizes and reduces much of the security and compliance costs.

Third, there is an overall reduction in hardware costs, maintenance, patching, policy maintenance, scanning/monitoring etc., since one overarching security solution applies across all of the devices (e.g., within the circle of trust 204) that are assigned to the LVM 202.

Fourth, there are labor/complexity reductions. This reduction is on the end-user side and also that of the OS procurement and Mass Storage Service (MSS) providers.

Furthermore, with an LVM, there is more consistency and opportunity to capture the end-user's habits using Behavior Analytics/Data Analytics.

Returning now to FIG. 2, utility pack 206 includes utilities (software that maintains and manages LVM 202) as well as metadata related to the software images 208, such as their address/location (e.g., an Internet Protocol—IP address) on a cloud, universal resource locator (URL) addresses, etc. That is, utility pack 206 includes instructions for configuring and deploying LVM 202, as well as how to locate the software images 208.

Software images 208 not only include data files such as music files, photo files, text files, etc., but also information about versions of the files, digital rights (e.g., copyright information) about the files, transaction histories for the files, the author of the files, etc. That is, software images 208 not only include any type of digital file (text, music, data, etc.), but also includes intellectual property information (e.g., regarding copyright status of the files, whether the files are proprietary, etc.). Software images 208 also includes a history of who/what has accessed the digital files, which device within the circle of trust 204 has been designated as the host peer in the blockchain environment created by the devices within the circle of trust 204, when the digital files were last updated, the version number of the digital files, etc.

Joint owners 210 define/identify the authorized joint owners of circle of trust 204. That is, joint owners 210 identify a particular person, enterprise, etc. that is authorized to use a particular device from the circle of trust 204 and to share software images with other devices in the circle of trust 204.

In one or more embodiments, the present invention utilizes the devices within the circle of trust 204 as peer devices in a blockchain environment. That is, devices 212-220 shown in FIG. 2 function as peers in a blockchain environment, such that they not only are able to acquire software images 208 from the LVM 202 and share software images to and from other devices within the circle of trust 204, but also use blockchain technology to protect the software images 208 from being divulged to an unauthorized party.

In an embodiment of the present invention, some or all of the software images 208 are initially created by one or more of the devices within circle of trust 204.

In an embodiment of the present invention, some or all of the software images 208 are initially created by a software image creating device 222, which in an embodiment of the present invention is a content supplier (e.g., a database server).

Also in communication with LVM 202 is a record of transactions 224, which describe content that has been created by and/or shared among devices within the circle of trust 204.

Also in communication within LVM 202 is a record of digital rights 226, which describe digital rights (e.g., copyrights) of content that is created using one or more of the devices within the circle of trust 204.

Also in communication with LVM 202 is a record of asset ownership 228 of devices within the circle of trust 204. This record includes identities of particular users who own (or are authorized to use) each of the devices in the circle of trust 204, in order to verify that the particular user is authorized to communicate with the LVM 202, provide content to the circle of trust 204, etc. The records of asset ownership 228 take on the form of legal documents (e.g., recorded registration of vehicle 214), a lookup table of authorized users/owners of laptop 212, etc.

In an embodiment of the present invention, the circle of trust 204 provides a blockchain environment that provides a secure environment for implementing the present invention. That is, one or more embodiments provide a secure environment in which content can be shared among devices in the circle of trust 204, which are physical devices. In one or more of such embodiments, the devices in the circle of trust 204 function as peers in a blockchain.

Exemplary blockchain environments, which are provided using the devices within the circle of trust 204 in accordance with one or more preferred embodiments of the present invention, are described now in FIGS. 3-7.

With reference now to FIG. 3, an illustration of an exemplary blockchain environment as used in one or more embodiments of the present invention is presented. As shown in FIG. 3, computers 301, 302, 303, 304, 305, and 306 (e.g., blockchain networked set of trusted devices 151 shown in FIG. 1, also represented in FIG. 2 as elements 212-220 within the circle of trust 204) represent an exemplary peer-to-peer network of devices used to support a peer blockchain environment (in which more or fewer computers/machines form the peer-to-peer network of devices). Each of the computers 301, 302, 303, 304, 305 and 306 (which are telecommunication devices, portable computers, servers, smart appliances, smart vehicles, cell phones, etc.) in the peer-to-peer network has a same copy of data (e.g., data that represents transaction events), as held in ledgers stored within the depicted blockchains 308, 309, 310 that are associated with respective computers 304, 305, 306.

As shown in FIG. 3, computer 303 (i.e., one of the devices within the circle of trust 204 shown in FIG. 2) sends a transaction Tx (e.g., a new request for a digital file from software images 208, a request to add or delete a device from the circle of trust 204, etc.) to LVM 202. LVM 202 then sends the transaction Tx to another device within the circle of trust 204, which is a blockchain environment peer that is depicted as computer 301. Computer 301 then sends the transaction Tx to ledgers known as the depicted blockchains 308, 309, 310 that are associated with other peers, including the depicted computers 302, 304, 305.

Blocks within exemplary blockchain 308 are depicted as block 311, block 312, and block 313. Block 313 is depicted as a newest entry into a ledger held in blockchain 308, and includes not only the newest transactions but also a hash of the data from the older block 312, which includes a hash of the even older block 311. Thus, older blocks are made even more secure each time a new block is created, due to the hashing operations.

Figure 4:
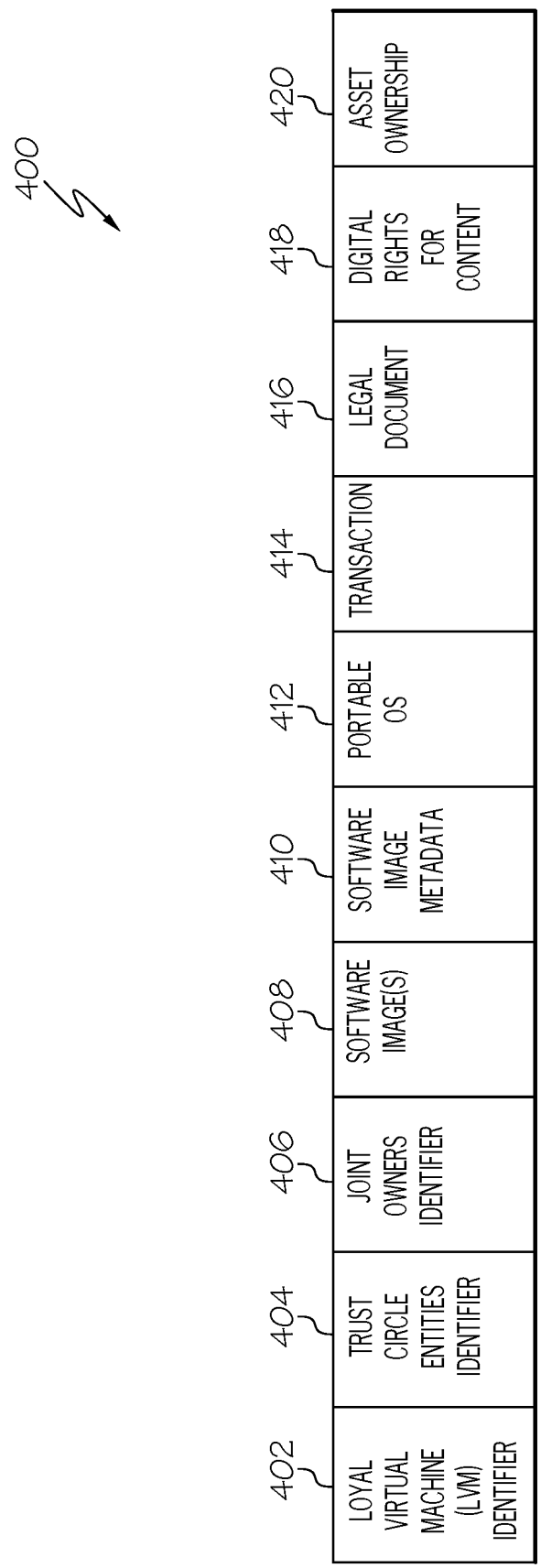
FIG. 4 depicts an exemplary blockchain ledger as used in one or more embodiments of the present invention.

With reference now to FIG. 4, an exemplary blockchain ledger 400 within blockchain 308 as utilized in one or more embodiments of the present invention is depicted.

In one or more embodiments of the present invention, blockchain ledger 400 includes an identifier of the LVM that supports the circle of trust 204, as shown in block 402. For example, in one or more embodiments of the present invention block 402 includes an internet protocol (IP) address, a uniform resource locator (URL), etc. of the LVM. This information is used by peers in the circle of trust 204 to locate software images 208, retrieve a portable OS (that can run on any of the devices in the circle of trust 204), etc.

In one or more embodiments of the present invention, blockchain ledger 400 also includes identifiers for each device within the circle of trust 204, as shown in block 404. In various embodiments of the present invention, these identifiers are in the form of IP addresses, media access protocol (MAC) addresses, universally unique identifiers (UUIDs), etc. of each device, or alternatively are in the form of a pseudonym (e.g., "Bob's refrigerator"), for which the IP, MAC address, UUID, etc. can be located using a lookup table that is either within block 404 or is located within utility pack 206 shown in FIG. 2. This information allows each device within the circle of trust 204 to know which devices are its blockchain peers.

In one or more embodiments of the present invention, blockchain ledger 400 also includes the identities of the persons or other entities (e.g., enterprises) that own or are otherwise associated with each of the devices within the circle of trust 204, as shown in block 406. This allows the devices within the circle of trust 204 to recognize an authorized person who creates a transaction for the circle of trust 204.

In one or more embodiments of the present invention, blockchain ledger 400 also includes a copy of one or more software images that are shared among the devices within the circle of trust 204, as shown in block 408. In one or more embodiments, these software images 208 originated in the cloud of software images 208 shown in FIG. 2, but are not blockchain-protected by the blockchain that is found within the blockchain environment that is provided by the LVM 202 and the circle of trust 204. This allows the members of the circle of trust 204 to maintain a copy of the software images (if space is available), such that there is no security risk from going "outside of the circle of trust 204" in order to retrieve the software image(s).

In one or more embodiments of the present invention, blockchain ledger 400 also includes software image metadata, as shown in block 410. This software image metadata includes information from the software images 208 such as copyright status, usage history, pseudonyms (e.g., "Bob's photo"), etc. of the software image(s) shown in block 408. This allows members of the circle of trust 204 to further recognize and manage the software image(s).

In one or more embodiments of the present invention, blockchain ledger 400 also includes a copy of a portable operating system (OS), as shown in block 412. That is, the OS that is used to access blockchains from other peer members of the blockchain environment, as well as accessing the software image(s) shown in block 408, is part of the blockchain, thus allowing the LVM to be indifferent to whatever base OS is used by each of the devices within the circle of trust 204, which are often different. This allows members of the circle of trust 204 to retrieve, store, transmit, execute, etc. the shared software image(s).

In one or more embodiments of the present invention, blockchain ledger 400 also includes a description of the transaction shown in FIG. 4 (see block 414), as provided by transactions 224 shown in FIG. 2. That is, assume that a member of the circle of trust 204 requests that a new software image 208 be promulgated among the devices within the circle of trust 204, or that a new member be added to the circle of trust 204, or that an existing member be removed from the circle of trust 204, or that a particular member of the circle of trust 204 be barred from accessing a certain software image that is being shared by other members of the circle of trust 204, etc. Within block 414 is either a description of the transaction (which can be retrieved using a lookup table), or executable code capable of performing the operation described in the transaction is stored within block 414 for immediate access by members of the circle of trust 204. This information is used by peers/devices within the circle of trust 204 to ensure that any newly received version of ledger 400 matches known activities (based on prior versions of the ledger 400).

In one or more embodiments of the present invention, blockchain ledger 400 also includes a copy of a legal document (see block 416), which describes rights to content that is to be shared among one or more of the devices within the circle of trust 204 depicted in FIG. 2.

In one or more embodiments of the present invention, blockchain ledger 400 also includes a description of digital rights for content (see block 418), which describes information from the digital rights 226 depicted in FIG. 2.

In one or more embodiments of the present invention, blockchain ledger 400 also includes a copy of asset ownership (see block 420), which is a copy of a document from asset ownership 228 that describes legal ownership of one or more of the devices within the circle of trust 204 depicted in FIG. 2.

Returning now to FIG. 3, computer 305 (e.g., laptop 212 shown in FIG. 2) has been designated as a leader peer according to a consensus model of the peer-to-peer network. In order to be designated as the leader peer, computer 305 has to be the first to "guess" what the data (i.e., the ledger) in Tx is. That is, computer 301 encrypted Tx with a known one-way encryption algorithm (e.g., Secure Hash Algorithm 2—"SHA-2"). Since this is a one-way encryption algorithm, there is no way to know what was used as the input by simply reverse-engineering the encryption. However, blockchain protocols require that the leading bits in the encrypted (hashed) data follow a certain pattern, such as eight leading zeros followed by other bits (e.g., "00000000xxxxxxxxxxxx"). Thus, computer 305 simply used brute force to input many combinations of data into the SHA-2 algorithm until an output of "00000000xxxxxxxxxxxx" is achieved. Since the first eight bits were correct ("00000000"), then there is an assumption that the other bits ("xxxxxxxxxxxx") are also correct, since the odds of getting "00000000" correct but not getting "xxxxxxxxxxxx" are extremely small. Note that while computer 305 is working on this problem (of guessing what the input data to the SHA-2 algorithm by computer 301 is), other computers such as computers 301-304 and 306 are also working on the problem.

Assume now that computer 305 won the "race" to decrypt Tx before computers 301-304 and 306. Thus, computer 305 will send the data ("00000000xxxxxxxxxxxx") in a newly-encrypted form (using a key provided by computer 301) to one or more of computers 301-304 and 306. One or more of computers 301-304 and 306 will then check computer 305's work. Once a predefined quantity of peer computers from computers 301-304 and 306 (in a preferred embodiment, all of the peer computers 301-304 and 306) agree that the decrypted value of Tx is correct, then computer 305 will be designated as the leader peer for Tx. That is, the nodes/computers that receive the new block/transaction (Tx) then attempt to validate the new block/transaction. If enough (i.e., some predefined quantity/percentage) of the nodes/computers validate the new block/transaction, then the new block/transaction is deemed valid for the entire peer-to-peer network of computers 301-306 and is added to the blockchains (including the depicted blockchains 308, 309, 310) associated with all of the nodes/peers/computers 301-306.

As such, the leader peer (computer 305) organizes all transactions from the nodes/peers/computers/telecommunication devices 301-306, and then shares new blocks/transactions (Tx) with other nodes (e.g., computers 303, 306) as depicted.

In one or more embodiments of the present invention, the blockchains (including the depicted blockchains 308, 309, 310) are "anchored" to a particular user by adding to the block/transaction information such as that shown in FIG. 4.

Figure 5:
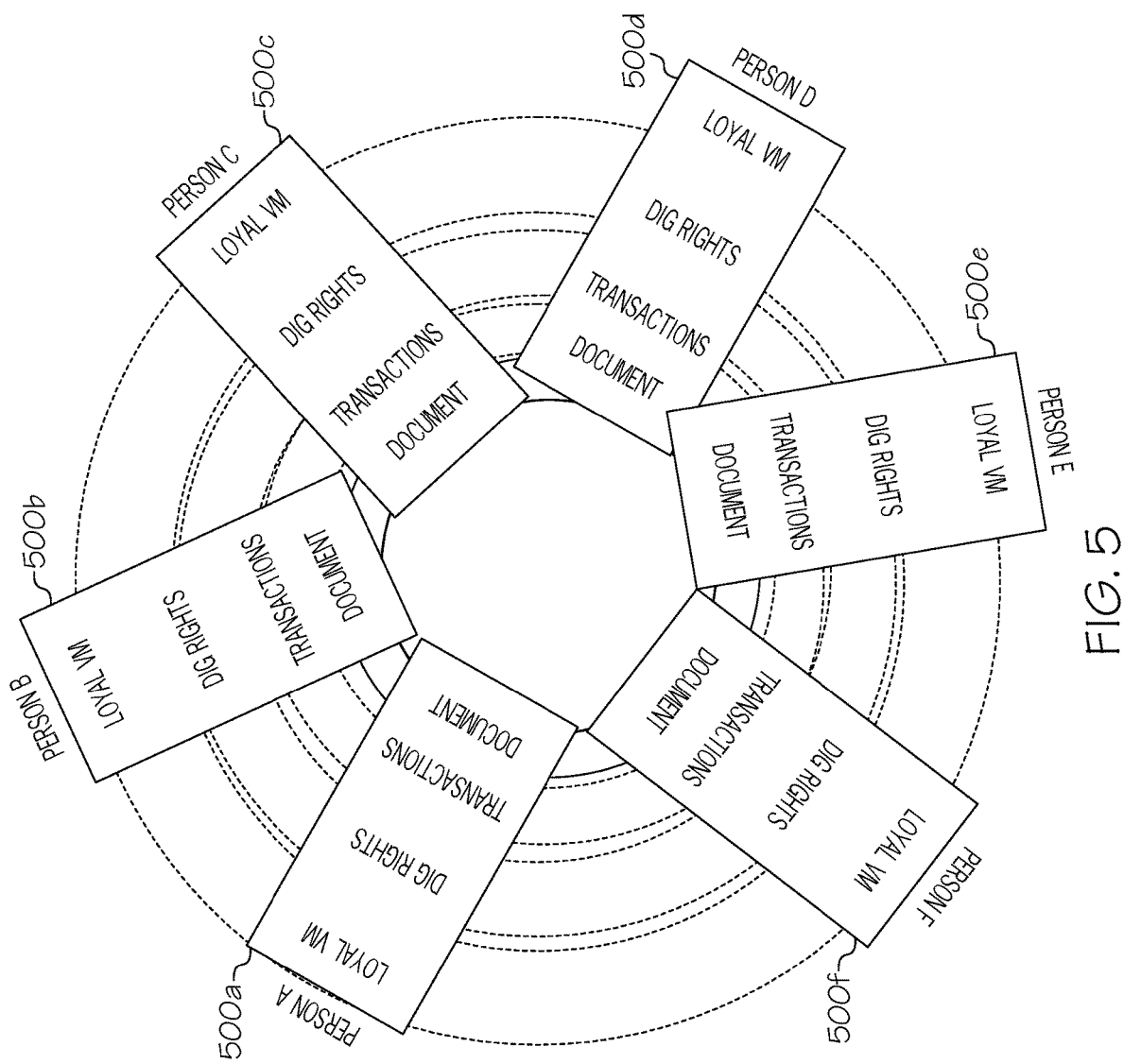
FIG. 5 illustrates multiple parties, each of which has his/her/its own block, according to one or more embodiments of the present invention.

As shown in FIG. 5, in an embodiment, each person using one of the devices within circle of trust 204 has his/her own block that is equivalent to block 400 shown in FIG. 4. That is, each person has a unique block that is part of the blockchain environment. Thus, Person A has his/her own block 500a; Person B has his/her own block 500b; Person C has his/her own block 500c; Person D has his/her own block 500da; Person E has his/her own block 500d; Person F has his/her own block 500f; etc.

Figure 6:
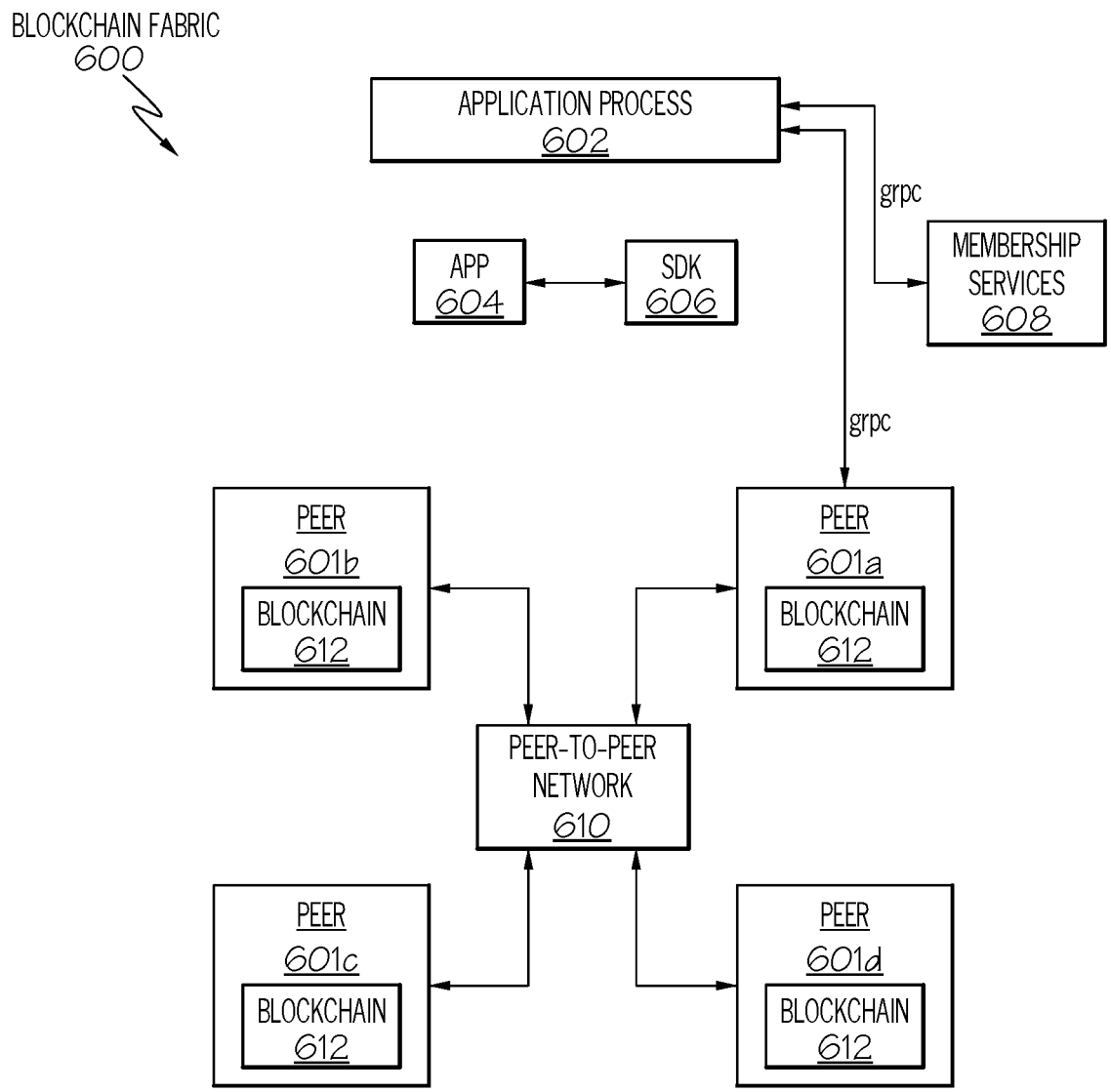
FIG. 6 depicts additional detail of an exemplary blockchain topology as used in one or more embodiments of the present invention.
Figure 7:
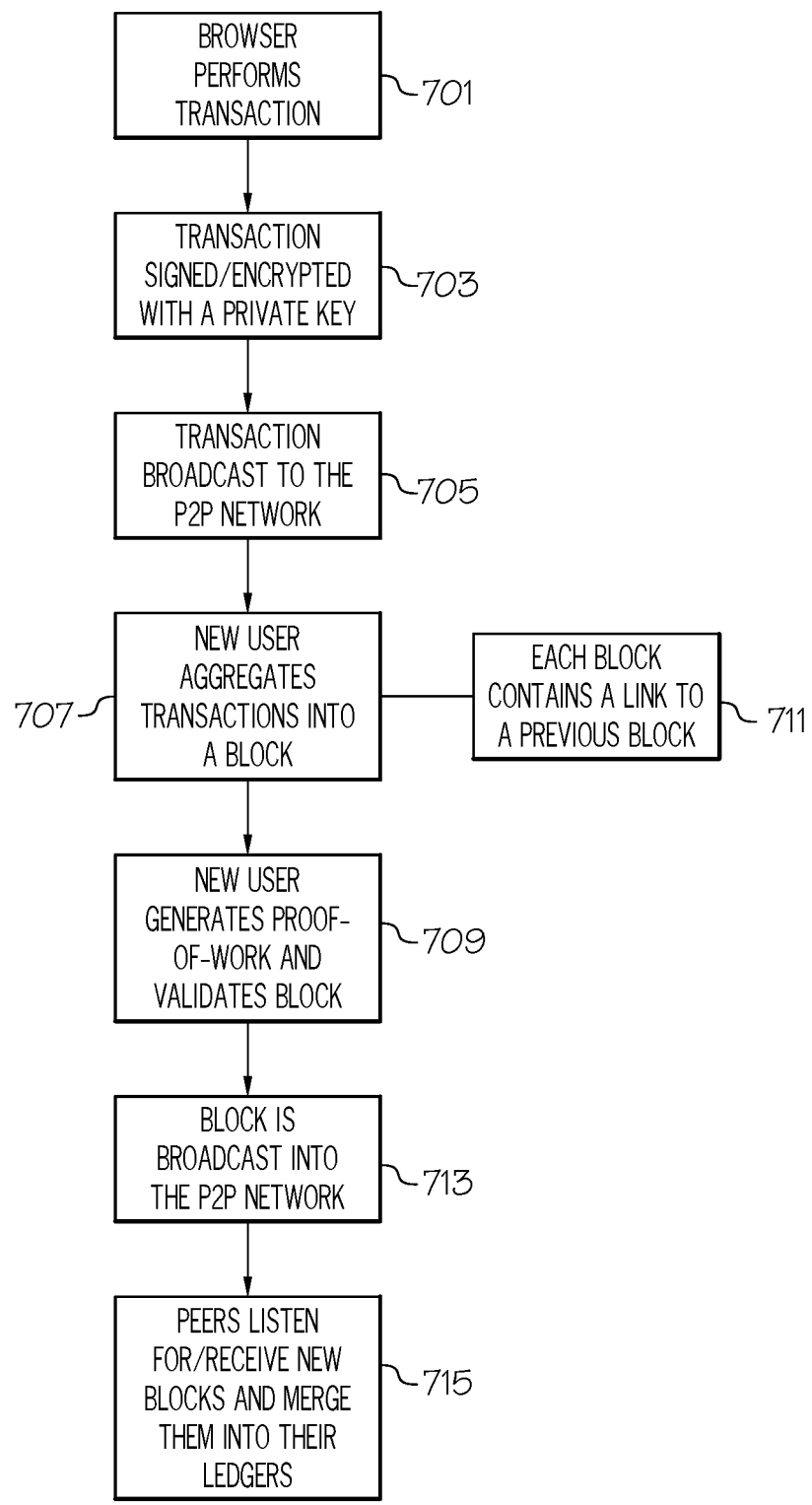
FIG. 7 illustrates a high-level use of a blockchain in accordance with one or more embodiments of the present invention.

With reference now to FIGS. 6-7, additional detail of a blockchain and its operation as used in one or more embodiments of the present invention is presented.

In one or more embodiments of the present invention, a blockchain fabric, such as blockchain fabric 600 depicted in FIG. 6, is used to provide the infrastructure (e.g. execution of the chaincodes) and services (e.g., Membership services such as Identity management) for securely and transparently storing, tracking and managing transactions on a "single point of truth". The blockchain fabric 600 maintains a verifiable record (of the single point of truth) of every single transaction ever made within the system. Once data are entered onto the blockchain, they can never be erased (immutability) or changed. That is, a change to a record would be regarded as issuing/introducing a new transaction. Prohibition of such thus ensures auditability and verifiability of data.

The blockchain fabric 600 (also known as the "blockchain system", "open blockchain" or "hyperledger fabric") is based on a distributed database of records of all transactions or digital events that have been executed and shared among participating parties. An individual transaction in the blockchain is validated or verified through a consensus mechanism incorporating a majority of the participants in the system. This allows the participating entities to know for certain that a digital event happened by creating an irrefutable record in a permissioned public ledger.

When a transaction is executed, its corresponding chaincode is executed by several validating peers of the system. For example, as shown in FIG. 6, peers 601a-601d (i.e., other computers, servers, etc.) establish the validity of the transaction parameters and, once they reach consensus, a new block is generated and appended onto the blockchain network. That is, an application process 602 running on a client (e.g., an application on LVM 202 shown in FIG. 3 executes an application such as the depicted App 604, causing a software development kit (SDK) 606 to communicate using general remote procedure calls (grpc) to membership services 608 that support the peer-to-peer network 610 that supports the blockchain 612 using the peers 601a-601d.

Exemplary operation of the open blockchain fabric 600 shown in FIG. 6 is presented in FIG. 7. As described in step 701, a browser or other device (e.g., LVM 202 shown in FIG. 3) performs a transaction (e.g., to retrieve updated data shared among devices within the circle of trust 204). As shown in step 703, the client (e.g., LVM 202) signs and encrypts the transaction with a private key, such as Secure Hash Algorithm (SHA)-2. This Secure Hash Algorithm (SHA-2)-encrypted transaction is then broadcast to the peer-to-peer network 610, as described in step 705. A new user (e.g., peer 601c) aggregates the transaction(s) into blockchain 612, as shown in step 707. As shown in block 711, each block contains a link to a previous block. The newly-revised blockchain 612 is validated by one or more of the other peers in peers 601a-601d (step 709), and is then broadcast to the peers 601a-601b and peer 601d, as described in step 713. These peers 601a-601b and peer 601d listen for and receive the new blocks and merge them into their copies of blockchain 612 (step 715).

Thus, the open blockchain fabric 600 shown in FIG. 6 is a blockchain deployment topology that provides a distributed ledger, which persists and manages digital events, called transactions, shared among several participants, each having a stake in these events. The ledger can only be updated by consensus among the participants. Furthermore, once transactions are recorded, they can never be altered (they are immutable). Every such recorded transaction is cryptographically verifiable with proof of agreement from the participants, thus providing a robust provenance mechanism tracking their origination.

As such, a blockchain fabric uses a distributed network to maintain a digital ledger of events, thus providing excellent security for the digital ledger, since the blockchain stored in each peer is dependent upon earlier blocks, which provide encryption data for subsequent blocks in the blockchain.

That is, the open blockchain fabric 600 shown in FIG. 6 provides a decentralized system in which every node in a decentralized system has a copy of the blockchain. This avoids the need to have a centralized database managed by a trusted third party. Transactions are broadcast to the network using software applications. Network nodes can validate transactions, add them to their copy and then broadcast these additions to other nodes. However, as noted above, the blockchain is nonetheless highly secure, since each new block is protected (e.g., encrypted) based on one or more previous blocks.

Figure 8:
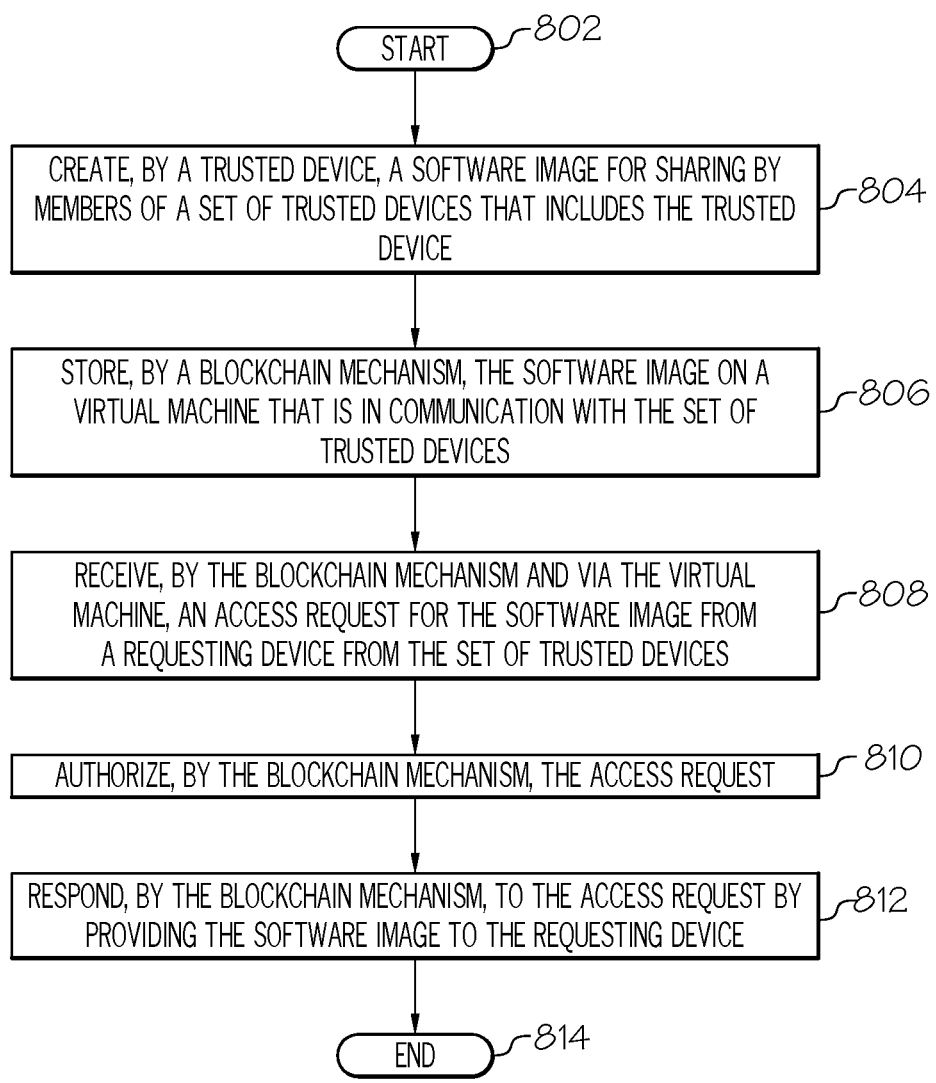
FIG. 8 is a high-level flow-chart of one or more steps performed in a processor-based method in accordance with one or more embodiments of the present invention.

With reference now to FIG. 8, a high-level flow chart depicting one or more embodiments of the present invention is presented.

After initiator block 802, a trusted device (e.g., one of the devices from the circle of trust 204 or, alternatively, another device such as software image creating device 222 shown in FIG. 2) creates a software image for sharing among members of a set of trusted devices that includes the trusted device, as described in block 804.

As described in block 806, a blockchain mechanism (e.g., an association of devices within the circle of trust 204 shown in FIG. 2) store the software image on a virtual machine (e.g., LVM 202, as shown in FIG. 2) that is in communication with the set of trusted devices. As described herein and described in FIGS. 3 and 6-7), the blockchain mechanism uses the set of trusted devices as peer members of the blockchain mechanism.

As described in block 808, the blockchain mechanism receives, via the LVM, an access request for the software image from a requesting device from the set of trusted devices. The blockchain mechanism authorizes the access request (block 810), and then responds to the access request by providing the software image to the requesting device (block 812).

The flow chart ends at terminator block 814.

In an embodiment of the present invention, the access request is a request to gain access to the software image by a new device that has been added to the set of trusted devices. That is, assume that a new member is added to the circle of trust 204. In this scenario, one of the members of the circle of trust 204 (preferably an established member and not the new member/device) requests that the new member/device be provided with the same software image(s) that the other members of the circle of trust 204 have access to.

In an embodiment of the present invention, the access request is a request to remove access to the software image by one of the trusted devices from the set of trusted devices. That is, in this embodiment, one of the members of the circle of trust 204 is prevented from accessing one or more of the software images that are shared by other members of the circle of trust 204.

In an embodiment of the present invention, the access request is a request by a new device to join the set of trusted devices. In this embodiment, a subsequent access request will be made to allow this new device to share the same software image(s) being shared by other members of the circle of trust 204.

In an embodiment of the present invention, the access request is a request by one of the trusted devices to relinquish membership in the set of trusted devices. That is, in this embodiment, rather than block access to the software images that are shared by other members of the circle of trust 204, a particular trusted device is evicted from the circle of trust 204.

In an embodiment of the present invention, the blockchain mechanism receives a request to change the software image, and then changes the software image (e.g., by executing the transaction shown in block 414 in FIG. 4). In an embodiment of the present invention, this change to the software image is an update to the software image.

As described herein and in an embodiment of the present invention, the virtual machine (e.g., LVM 202 shown in FIG. 2) is in a cloud environment, and the set of trusted devices (shown within the circle of trust 204 in FIG. 4) is a set of Internet of Things (IoT) devices, such as smart appliances, smart vehicles, etc. that are able to communicate with one another and process data, even though their primary purpose is non-computing (e.g., keeping food cold, providing transportation, etc.)

In one or more embodiments of the present invention, a Deployment Engine (part of LVM 202 or alternatively, one of the devices within the circle of trust 204) determines the target device type (i.e., the type of device within the circle of trust 204 that is requesting a change/deletion/addition of data to be shared among the devices within the circle of trust 204) and deploys only software images that all of the devices can handle. For example, and in one embodiment of the present invention, if some of the devices are not able to process image files, then such files will not be shared among the devices within the circle of trust 204. Furthermore, and in an embodiment of the present invention, the Deployment Engine also works as a "mother ship" that keeps track of different devices, their users, data accumulation from different target devices, etc.

In an embodiment of the present invention, data (e.g., software images 208) is physically not stored on the devices within the circle of trust 204. That is, in this embodiment the software image(s) are not in block 408 of the blockchain 400 shown in FIG. 4, but rather pointers to such images are stored in block 408.

In an embodiment of the present invention, a target device (e.g., a device within the circle of trust 204 that is requesting data, is acting as a blockchain peer, etc.) is an emulator with touch/non-touch screen capable of running any type of hardware including a memory, a processor, and disk-space to host the software image(s).

In an embodiment of the present invention, the devices within the circle of trust 204 include an application that is able to host a virtual network (e.g., analogous to network 127 shown in FIG. 1, except that it is integrated within the blockchain networked Set of Trusted Devices 151) that surrounding devices can communicate to mimicking a local cloud type network.

At the time of deployment of software image(s) to target devices within the circle of trust 204, the mother ship (either LVM 202 or a host peer device from the circle of trust 204) provides options to the devices in the circle of trust 204, such as a list of applications that will run on the devices within the circle of trust 204.

For example, assume that a screen on a refrigerator (e.g., element 216 shown in FIG. 2) can air television shows, act as a movie player, display a to-do list, but can choose not to run or host a server on it. As such, another device from the circle of trust 204 can host the data being shared, which is then shared (via blockchain 400 shown in FIG. 4) with the other devices from the circle of trust 204.

In an embodiment of the present invention, the circle of trust 204 is a group of resources identified by LVM 202 to access certain information. For example, assume that a user is camping in the woods, and does not have access to the Internet. Assume further that the circle of trust 204 for that camping user includes his/her car (e.g., vehicle 214 shown in FIG. 2), which can communicate with his/her cell phone 218 via a short-range communication system.

Therefore, if his/her car has a certain software image (e.g., a movie), then the user can access that movie on his/her smart phone using the circle of trust 204 as described herein.

In one or more embodiments of the present invention, the circle of trust 204 and/or LVM 202 are accessible and usable only by trusted users (joint owners 210 shown in FIG. 2), which have been predefined as being authorized to use one or more the devices within the circle of trust 204.

In one or more embodiments of the present invention, all members/devices within the blockchain trusted circle 204 are able to acquire digital rights of content (e.g., photos, music, books, stock transactions, etc.), and are able to authorize other devices within the blockchain trusted circle 204 to have authority to alter, delete, etc. the content.

In one or more embodiments of the present invention, a loyal VM utility pack 206 and/or software images shared by the members of the circle of trust 204 are created on any type of machine, including virtual machines, physical machines, servers, client computers, etc. The utility pack is an app-like entity that will hold commercial content of created content and share between members of circle of trust 204. The utility pack can reside on any device regardless of the OS. In one or more embodiments of the present invention, one of the members of circle of trust 204 creates the software image(s) that are shared with other members of the circle of trust 204. However, in a preferred embodiment of the present invention, all members of the circle of trust 204 have the same level of authority.

In an embodiment of the present invention, deletion of the content or the utility pack 206 and/or software images shared by the members of the circle of trust 204 is only possible when all active circle of trust 204 members agree to it. That is, in this embodiment, there must be concurrence/approval of all within the members of the circle of trust 204.

In an embodiment of the present invention, the utility pack 206 for the LVM 202 and/or software images shared by the members of the circle of trust 204 is authenticated through biometric data inputs, password based or leveraging blockchain based trusted identities of the joint owners 210. That is, an originator of the utility pack 206 will invite others over available communication methods (e.g., email, text messages, nearfield communication such as bump technologies that communicate by bumping two devices together, etc.) that bridge communications between the originator and invitee. After the originator and invitee make the initial communication, in an embodiment of the present invention the originator or one of the devices within the circle of trust 204 will second the communication to allow the member to join.

In an embodiment of the present invention, a member of the circle of trust 204 (i.e., one of the joint owners 210) puts in a request to leave the circle of trust 204. In this embodiment, all other members to the circle of trust 204 must agree to de-provision that member. In another embodiment of the present invention, member access is put into deactivate mode (not de-provision) by agreement of all other members, such that the joint owner that is leaving the circle of trust 204 is merely suspended, but not permanently barred, from the circle of trust 204.

While the present invention has been described in detail above in the context of a blockchain environment, in another embodiment the present invention is implemented in a non-blockchain environment. That is, in FIG. 2 the circle of trust 204 is a group of trusted devices, but these devices do not act as peers in a blockchain environment, as described above. Rather, the secure trusted environment that allows one of the devices in the circle of trust 204 to share content with other devices in the circle of trust is provided by the LVM 202. That is, the LVM 202 is 1) dedicated to the devices within the defined circle of trust 204; and 2) controls requests from members of the circle of trust 204 for content from other members of the circle of trust 204. LVM 202 provides a secure trusted environment by the use of passwords, biometric readings, and/or Internet Protocol (IP) and/or Media Access Control (MAC) addresses of the requesting device from the circle of trust 204.

For example, assume that LVM 202 has received a request from laptop 212 to receive content from another device within the circle of trust 204. The LVM 202 will 1) confirm that the user who sent this request is who he/she says he/she is by taking biometric readings (e.g., an iris scan, a fingerprint scan, etc.) of that person, as well as requiring that the user sends the LVM 202 a password required for sharing content. Furthermore, LVM 202 will ensure that laptop 212 is what it claims to be by accessing the IP address that provided the network connection between laptop 212 and the LVM 202, and/or the MAC address of the physical device itself that is laptop 212.

Similarly, assume that LVM 202 has received a request from laptop 212 to share content within laptop 212 with all other devices within the circle of trust 204. The LVM 202 will 1) confirm that the user who sent this request is who he/she says he/she is by taking biometric readings (e.g., an iris scan, a fingerprint scan, etc.) of that person, as well as requiring that the user sends the LVM 202 a password required for sharing content. Furthermore, LVM 202 will ensure that laptop 212 is what it claims to be by accessing the IP address that provided the network connection between laptop 212 and the LVM 202, and/or the MAC address of the physical device itself that is laptop 212.

Figure 9:
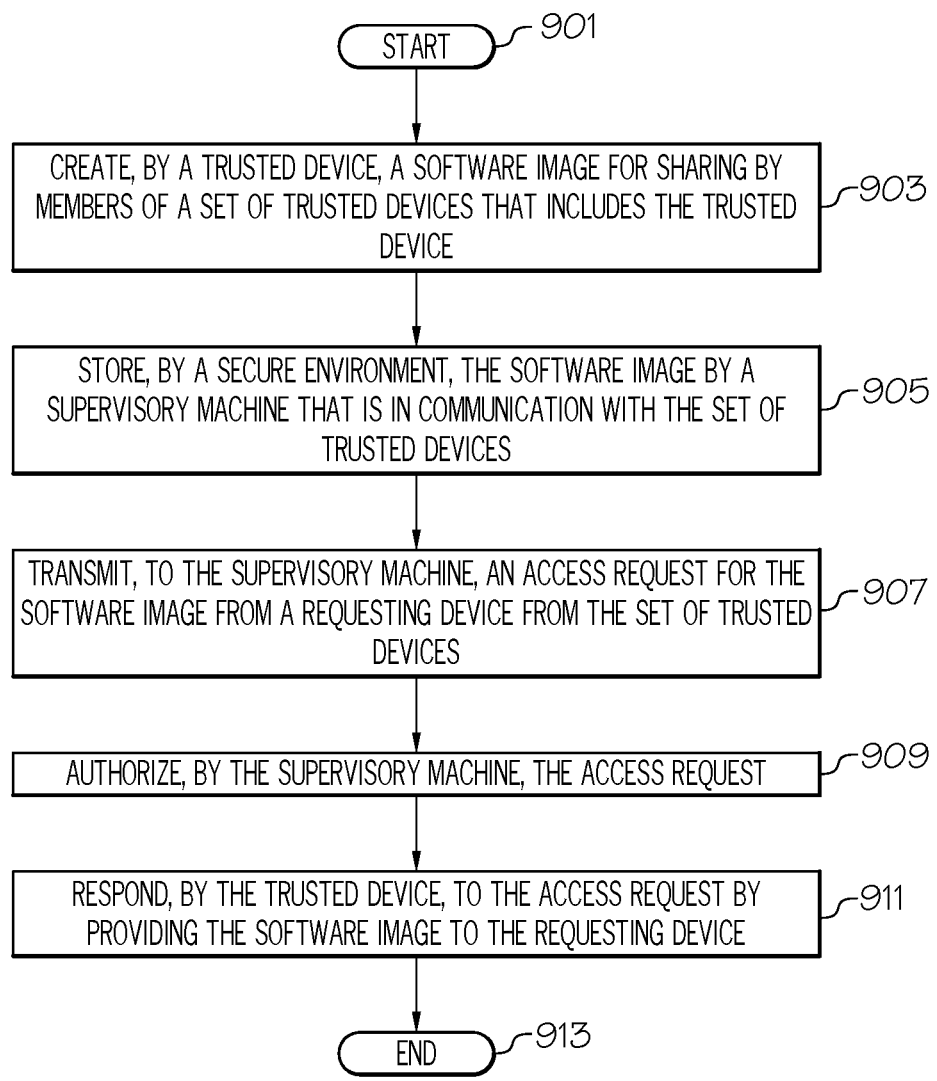
FIG. 9 is a high-level flow-chart of one or more steps performed in a processor-based alternative embodiment of the present invention.

With reference then to FIG. 9, after initiator block 901, a trusted device (e.g., laptop 212 from the circle of trust 204 shown in FIG. 2) creates a software image (e.g., a digital photo) for sharing among members of a set of trusted devices (e.g., circle of trust 204) that includes the trusted device (block 903). A secure environment (e.g., the operations of and interactions between LVM 202 and the laptop 212 described above) stores the software image (e.g., part of software images 208) by using the supervisory machine (i.e., LVM 202), which is in communication with the set of trusted devices (block 905). A requesting device from the set of trusted devices transmits, to the supervisory machine, an access request for the software image (block 907). The supervisory machine authorizes the access request (block 909), thus allowing the trusted device to provide the software image to the requesting device (block 911). The flow chart ends at terminator block 913.

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
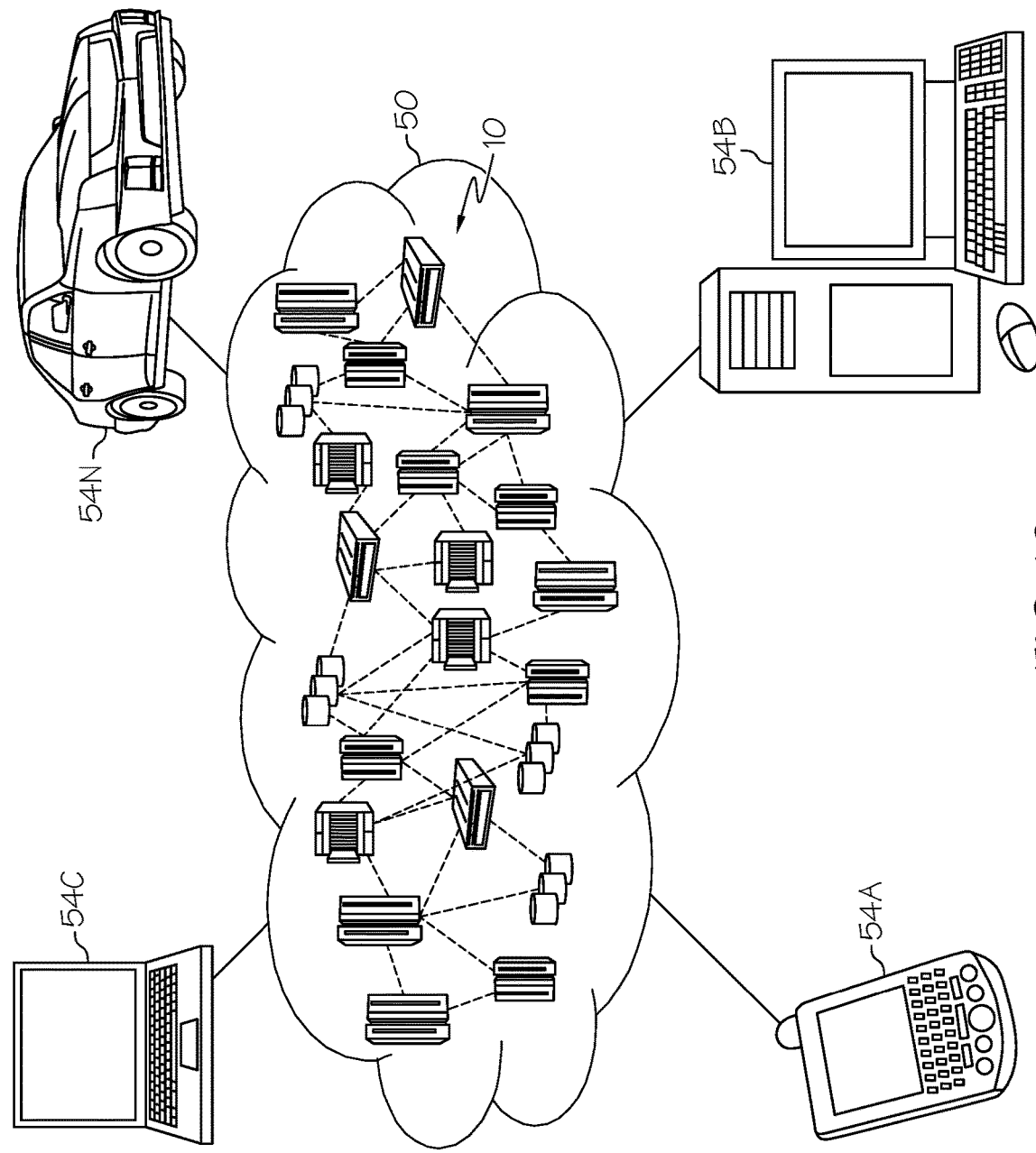
FIG. 10 depicts a cloud computing environment according to an embodiment of the present invention.

Referring now to FIG. 10, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 10 are intended to be illustrative only and that computing nodes 10 and cloud computing environment 50 can communicate with any type of computerized device over any type of network and/or network addressable connection (e.g., using a web browser).

Figure 11:
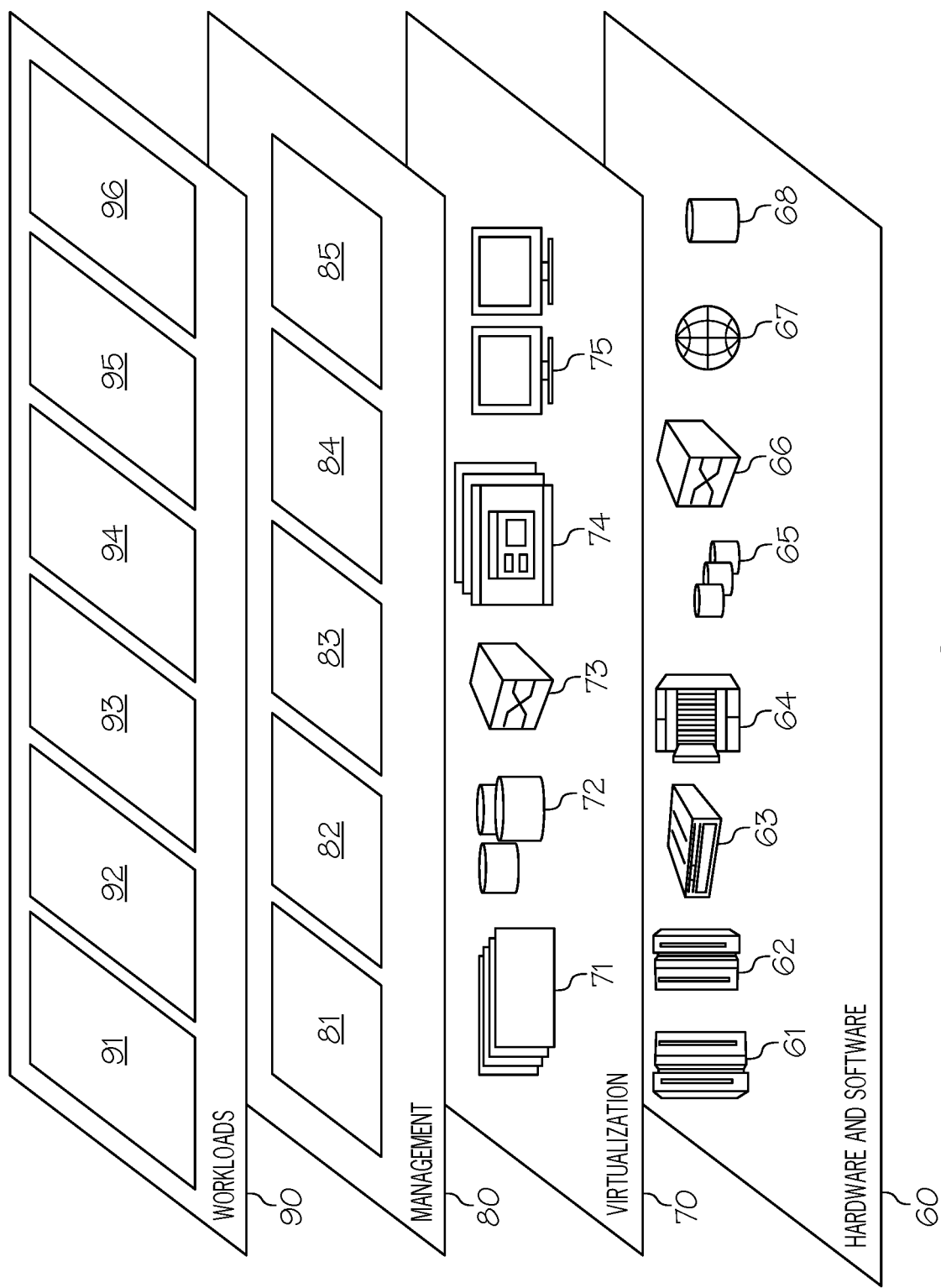
FIG. 11 depicts abstraction model layers of a cloud computer environment according to an embodiment of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and circle of trust-based software image management processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present disclosure are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
    creating, by a trusted device, a software image for sharing among members of a set of trusted devices that includes the trusted device;
    storing, by a blockchain mechanism, the software image on a virtual machine that is in communication with the set of trusted devices, wherein the blockchain mechanism uses the set of trusted devices as peer members of the blockchain mechanism;

receiving, by the blockchain mechanism and via the virtual machine, an access request for the software image from a requesting device from the set of trusted devices;

authorizing, by the blockchain mechanism, the access request;

determining that one or more of the trusted devices in the set of trusted devices are unable to process the software image; and in response to determining that one or more of the trusted devices in the set of trusted devices are unable to process the software image, blocking the software image from being shared among trusted devices within the set of trusted devices.

2. The method of claim 1, wherein the access request is a request to gain access to the software image by a new device that has been added to the set of trusted devices.

3. The method of claim 1, wherein the access request is a request to remove access to the software image by one of the trusted devices from the set of trusted devices.

4. The method of claim 1, wherein the access request is a request by a new device to join the set of trusted devices.

5. The method of claim 1, wherein the access request is a request by one of the trusted devices to relinquish membership in the set of trusted devices.

6. The method of claim 1, further comprising:

receiving, by the blockchain mechanism, a request to change the software image; and in response to receiving the request, changing, by the blockchain mechanism, the software image.

7. The method of claim 6, wherein changing the software image updates the software image.

8. The method of claim 1, wherein the virtual machine is in a cloud environment, and wherein the set of trusted devices comprises a set of Internet of Things (IoT) devices.

9. The method of claim 1, wherein the access request is a request by a particular trusted device from the set of trusted devices to leave the set of trusted devices, and wherein the method further comprises:

determining that at least one trusted device from the set of trusted devices does not agree to allow the particular trusted device to leave the set of trusted devices; and in response to determining that at least one trusted device from the set of trusted devices does not agree to allow the particular trusted device to leave the set of trusted devices, blocking the particular trusted device from leaving the set of trusted devices.

10. The method of claim 1, wherein a first trusted device within the set of trusted devices is able to communicate with a second trusted device within the set of trusted devices via short-range communication system, and wherein the method further comprises:

determining that the first trusted device is unable to communicate with a network;

determining that the second trusted device is able to communicate with the network;

in response to determining that the first trusted device is unable to communicate with the network and in response to determining that the second trusted device is able to communicate with the network, loading the software image from the network onto the second trusted device; and in response to the software image being loaded from the network onto the second trusted device, sharing the software image between the second trusted device and the first trusted device via the short-range communication system.

11. The method of claim 1, wherein each trusted device from the set of trusted devices is owned by a particular user, and wherein each particular user has a unique block that is used in a blockchain by the blockchain mechanism, and wherein each unique block comprises an identifier of a loyal virtual machine (LVM) that manages the blockchain mechanism, an identifier of each trusted device within the set of trusted devices, and a copy of the software image, a portable operating system that enables all of the trusted devices from the set of trusted devices to access blockchains from other trusted devices in the set of trusted devices, wherein the method further comprises:

retrieving, by a requesting trusted device from the set of trusted devices, the software image from the blockchain mechanism without going outside of the set of trusted devices.

12. The method of claim 1, wherein the virtual machine is a loyal virtual machine (LVM), wherein the LVM comprises a container for a portable operating system located in a utility pack, wherein the LVM resides on another virtual machine, wherein the LVM enables the software image to be stored and played on any device from the set of trusted devices, wherein the LVM uses the set of trusted devices as the blockchain mechanism to share the software image among devices in the set of trusted devices, and wherein the method further comprises:

generating a record of asset ownership for trusted devices in the set of trusted devices, wherein the record of asset ownership includes identities of particular users who are authorized to use each of the trusted devices in the set of trusted devices;

verifying, from the record of asset ownership, that a particular user is authorized to use a particular trusted device from the set of trusted devices;

in response to verifying that the particular user is authorized to use the particular trusted device from the set of trusted devices, authorizing the particular user to communicate with the LVM in order to provide new content to the set of trusted devices.

13. The method of claim 1, wherein the software image is owned by a first trusted device from the set of trusted devices, wherein the first trusted device is a first type of trusted device from a trusted device type group consisting of a server, a laptop computer, a vehicle, a household appliance, and a cell phone, and wherein all other trusted devices in the set of trusted devices are from the device type group except for the first type of trusted device.

14. A computer program product for providing a software image to a requesting device from a set of trusted devices, wherein the computer program product comprises a non-transitory computer readable storage device having program instructions embodied therewith, the program instructions readable and executable by a computer to perform a method comprising:

creating, by a trusted device, a software image for sharing among members of a set of trusted devices that includes the trusted device;

storing, by a blockchain mechanism, the software image on a virtual machine that is in communication with the set of trusted devices, wherein the blockchain mechanism uses the set of trusted devices as peer members of the blockchain mechanism;

receiving, by the blockchain mechanism and via the virtual machine, an access request for the software image from a requesting device from the set of trusted devices;

authorizing, by the blockchain mechanism, the access request;

determining that one or more of the trusted devices in the set of trusted devices are unable to process the software image; and in response to determining that one or more of the trusted devices in the set of trusted devices are unable to process the software image, blocking the software image from being shared among trusted devices within the set of trusted devices.

15. The computer program product of claim 14, wherein the access request is a request to gain access to the software image by a new device that has been added to the set of trusted devices.

16. The computer program product of claim 14, wherein the access request is a request to remove access to the software image by one of the trusted devices from the set of trusted devices.

17. The computer program product of claim 14, wherein the program instructions are provided as a service in a cloud environment.

18. A computer system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising:

receiving, from a trusted device, a software image for sharing among members of a set of trusted devices that includes the trusted device;

storing, on a blockchain mechanism, the software image on a virtual machine that is in communication with the set of trusted devices, wherein the blockchain mechanism uses the set of trusted devices as peer members of the blockchain mechanism;

receiving, by the blockchain mechanism, an access request for the software image from a requesting device from the set of trusted devices;

authorizing the access request;

determining that one or more of the trusted devices in the set of trusted devices are unable to process the software image; and in response to determining that one or more of the trusted devices in the set of trusted devices are unable to process the software image, blocking the software image from being shared among trusted devices within the set of trusted devices.

19. The computer system of claim 18, wherein the virtual machine is in a cloud environment, and wherein the set of trusted devices comprises a set of Internet of Things (IoT) devices.

\* \* \* \* \*